United States Patent [19]

Erickson

[11] 4,202,650
[45] May 13, 1980

[54] SHIM LOCK TOOLHOLDER

[75] Inventor: Robert A. Erickson, Ligonier, Pa.

[73] Assignee: Kennametal Inc., Latrobe, Pa.

[21] Appl. No.: 951,022

[22] Filed: Oct. 13, 1978

[51] Int. Cl.² .............................................. B26D 1/12
[52] U.S. Cl. ....................................... 407/46; 407/48; 407/101; 407/103; 407/104
[58] Field of Search .................... 407/48, 46, 101, 103, 407/104, 33, 34

[56] References Cited

U.S. PATENT DOCUMENTS

| 3,102,326 | 9/1963 | Conti et al. | 407/101 |
| 3,303,553 | 2/1967 | Severson | 407/104 |
| 3,831,237 | 8/1974 | Gunsalus | 407/48 |
| 3,856,427 | 12/1974 | Lovendahl | 408/239 |
| 3,902,232 | 9/1975 | Hertel | 407/104 |
| 3,946,475 | 3/1976 | Hopkins | 407/48 |

Primary Examiner—Leonidas Vlachos
Attorney, Agent, or Firm—Lawrence R. Burns

[57] ABSTRACT

A toolholder is disclosed consisting of a body having a recess extending inwardly from the periphery. The recess is formed having an inwardly extending front and back wall, defining a bottom wall therebetween. A shim is disposed in the recess with the back side abutting the back wall of the recess and being supported thereby, the shim having a protuberance on its front side for engaging a center hole of an insert. A pin member is imbedded in the bottom wall of a recess and located adjacent to, or in the region of, the front wall and means is provided for clamping the insert between the shim and bottom wall of the recess and the pin.

4 Claims, 8 Drawing Figures

U.S. Patent     May 13, 1980     4,202,650
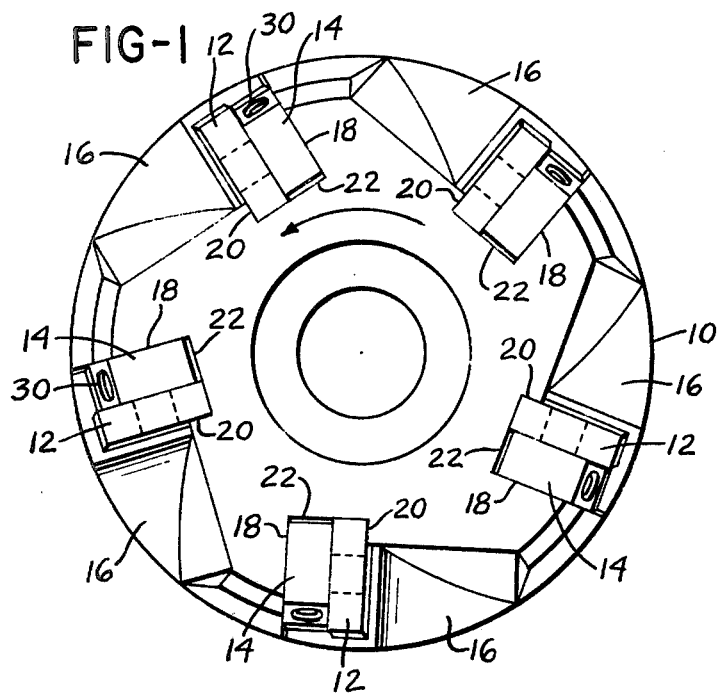
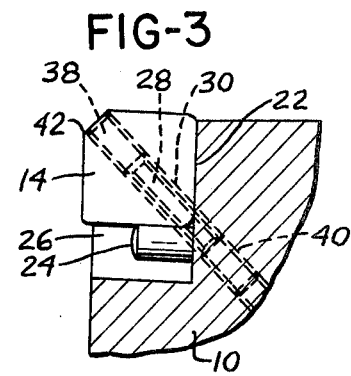
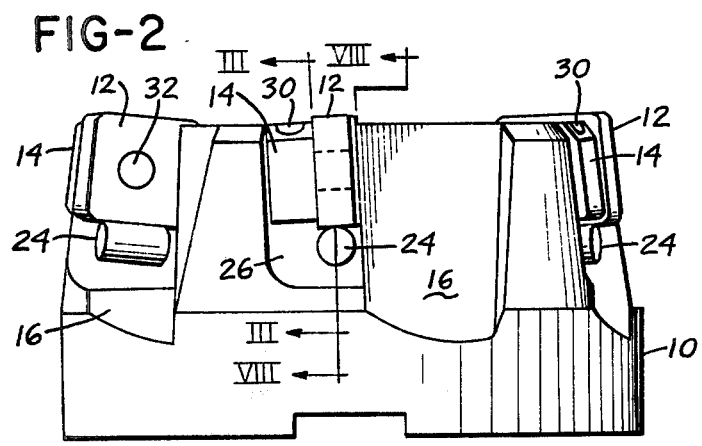
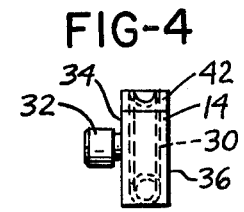
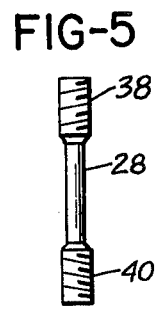
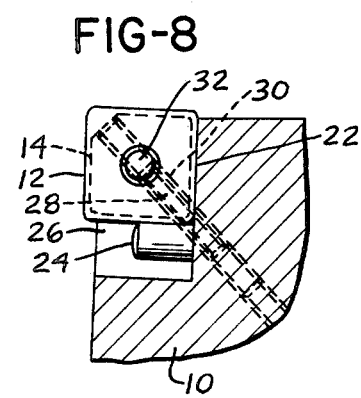
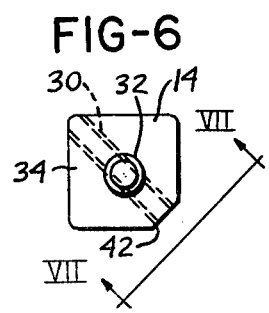
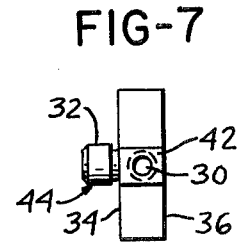

SHIM LOCK TOOLHOLDER

BACKGROUND OF THE INVENTION

The present invention relates to toolholders and, especially, to a shim lock mechanism used to hold an insert in place on a stationary or rotary toolholder.

Many toolholders and milling cutters and the like are designed so as to mount a polygonal insert on the end or periphery of the toolholder or milling cutter. Inserts manufactured for such support bodies can have a center hole provided thereon so that they may be clamped at least between a pin member and a side wall provided in the support body.

It is desired, when using such polygonal inserts, that the inserts be indexable and invertable. Therefore, mechanisms are needed that will allow the machine operator a fast, but yet efficient, method of indexing or replacing a cutting insert when it becomes worn.

Several examples of toolholders or milling cutters that clamp an insert such as that described above may be had by a review of U.S. Pat. Nos. 3,238,600; 3,310,859 and 3,788,625. Other types of tool support bodies, such as broaches, may also be reviewed by a study of U.S. Pat. Nos. Re. 28,239; 3,656,220 and 3,103,736.

While the above-mentioned patents have provided some answers to the problems encountered in the industry, it is a desired objective of the present invention to provide a reliable shim locking mechanism that is fast, efficient and not too expensive to manufacture.

BRIEF SUMMARY OF THE INVENTION

According to the present invention, the cutter support comprises a body having at least one recess extending inwardly of its periphery. The recess is formed so as to have an inwardly extending back wall and a front wall substantially parallel thereto. The front and back walls define a bottom to the recess that extends between the front and back walls.

The width of the bottom wall is designed so that a shim may be placed in the recess with the back side abutting the back wall of the recess and, preferably, a side parallel to the bottom wall of the recess.

In addition to the shim, a side of an insert will be supported on the bottom wall of the recess in front of the shim member. The shim has a protuberance extending from its front side for engagement with the center hole formed in the insert.

Extending transversely through the bottom wall of the recess is a pin member which is located adjacent to the front wall of the recess so as to be able to abut firmly a side of the cutting insert. Means are provided in the mechanism for moving simultaneously the shim member toward the bottom wall of the recess and the pin so that the cutting insert can be clamped firmly between the shim, the bottom wall and the pin.

Preferably, means for moving the shim comprises a threaded member having one end threadedly connected to the cutter body and a support end connected to the shim member. Preferably, the threaded member has each end oppositely threaded from one another, and when in place, forms an acute included angle with the bottom of the recess of the support body.

The threaded member, when rotated in one direction, will then cause the shim member to move simultaneously inwardly of the cutter body and downwardly toward the bottom wall of the recess. Conversely, when the threaded member is rotated in an opposite direction, the threaded member will cause the shim member to move radially outwardly of the center of the cutter body and upwardly from the bottom wall of the recess.

The exact nature of the present invention will become more clearly apparent upon reference to the following detailed specification taken in connection with the accompanying drawings in which:

BRIEF DESCRIPTION OF THE DRAWINGS

FIG. 1 is a plan view of an end of a milling cutter according to the present invention.

FIG. 2 is a side view of the milling cutter of FIG. 1.

FIG. 3 is a fragmented sectional view of III—III of FIG. 2.

FIG. 4 is a side view of the shim member according to the present invention.

FIG. 5 is the preferred embodiment of a means for moving the shim member according to the present invention.

FIG. 6 is a plan view of the shim member of FIG. 4.

FIG. 7 is a sectional view of VII—VII of FIG. 6.

FIG. 8 is a sectional view of VIII—VIII taken through FIG. 2.

DETAILED DESCRIPTION OF THE INVENTION

Referring to the drawings somewhat more in detail, shown in FIG. 1 is a milling cutter body 10 that represents an indexable cutter support body. It will be realized that the cutter support body could be a simple toolholder, or other special forms, such as broaches, etc., but that for the present application, the invention is illustrated specifically on a milling cutter body.

Mounted on cutter support body 10 is a cutting insert 12 and a shim member 14. The cutter support body 10 rotates in the direction of the arrow and has a chip clearance area 16 formed in its outer periphery. A recess is also formed on the outer periphery of cutter body 10 and has an inwardly extending back wall 18 and a substantially parallel, inwardly extending front wall 20.

Back wall 18 and front wall 20 define a bottom wall 22 which extends between front wall 20 and back wall 18. The bottom wall 22, as can be seen, is dimensioned so as to be able to accept the shim member 14 and the insert 12 so as to be seated and supported on the bottom wall 22.

Shown more clearly in FIG. 2 is the cutter body 10 with its chip clearance recess 16 and a cutting insert 12 mounted in the periphery of the milling cutter 10. Shim member 14 is shown abutting the back wall 18 of the recess and a side of the insert 12 is shown abutting pin member 24. Pin member 24 is shown extending radially inwardly of the cutter support body 10 and abutting a side wall of shim member 14.

Referring to FIG. 3, the clamping action can be seen more clearly on cutter body 10. The pin member 24 can be seen mounted in the bottom wall of the recess 26 and nearly abutting a side of the shim member 14.

Threaded element 28 is shown having one end connected to the cutter body 10 and also forming an acute included angle with the bottom wall 22 of the recess 26. The other end of the threaded element 28 is shown connected to the shim member 14. Shim member 14, in this illustration, is a rectangular element and the threaded member is shown extending diagonally through the rectangular element thereby forming the acute included angle with the bottom wall 22 of recess 26.

As will be seen in FIG. 5, the opposite ends of the threaded member 28 are oppositely threaded such that rotation of the threaded member 28 in one direction will cause the shim member 14 to simultaneously move upwardly from the bottom wall 22 and away from the pin member 24. Conversely opposite rotation of the threaded member 28 will cause the shim member 14 to move toward the bottom wall 22 simultaneously as it moves toward pin member 24.

Shown in FIG. 4, shim member 14 has a hole 30 therein that is preferably threaded so as to accept threaded member 28. Shim member 14 has a protuberance 32 on its front face 34 and has a back wall 36 that is adapted to mate with the back wall 18 of recess 26. Protuberance 32 is adapted to mate with a center hole of cutting insert 12 and extend substantially through the width of the insert 12.

In FIG. 5 is shown threaded member 28 having opposing ends 38 and 40. Ends 38 and 40 are preferably threaded in opposing directions such as 38 having right-hand threads formed thereon and 40 having lefthand threads formed thereon.

Threaded shim member is shown in FIG. 6 in a plan view being rectangular in nature and having protuberance 32 upwardly thereon. Hole 30 is shown extending diagonally in rectangular shim member 14 and mating with an edge 42 of the shim member 14.

FIG. 7 shows a view VII—VII of shim member 14 with the protuberance 32 preferably having enlarged outer portion 44 and showing the hole 30 extending downwardly through shim member 14.

Referring now to FIG. 8, the milling cutter body 10 has one end of threaded member 28 connected thereto and another end of threaded member 28 is connected to the shim member 14, the protuberance 32 of which is engaged through the center hole of cutting insert 12. A recess 26 is shown having a bottom wall 22.

As explained in FIG. 3, when a threaded member is rotated, the protuberance 32 mounted on shim member 14 will tend to raise the insert 12 simultaneously away from bottom wall 22 and outwardly from pin member 24. When rotated in an opposite direction, the protuberance 32 moving in shim member 14 will cause the insert 12 to move simultaneously downwardly toward bottom wall 22 and pin 24. The protuberance 32 can only move downwardly toward bottom wall 22 and pin 24 until the sides of insert 12 firmly abut bottom wall 22 and pin 24.

When this occurs, the insert is firmly clamped between protuberance 32 of pin member 14 and bottom wall 22 of recess 26 and pin 24 mounted in cutter body 12. The pin member 24 is preferable in the construction of the toolholder, but it can take other forms that act as insert supports that are transverse to the bottom wall of the pocket and located adjacent the front wall so as to firmly abut a side of the insert.

Modifications may be made within the scope of the appended claims.

I claim:

1. In a cutter: a cutter body having at least one recess extending inwardly of the periphery thereof, said recess having an inwardly extending back wall and a front wall parallel thereto; said back and front walls defining a bottom to said recess therebetween; a shim disposed in said recess and having a back side abutting said back wall thereof and being supported thereby, said shim having a front side substantially parallel to said back side; said shim having a protuberance extending from the front side thereof for engagement with a center hole on an insert; an insert support pin extending transversely through said bottom wall and located adjacent said front wall so as to firmly abut a side of a cutting insert; and means for simultaneously moving said shim toward said bottom wall and toward said pin so that the cutting insert can be firmly clamped between the shim, the bottom wall and said pin.

2. A cutter according to claim 1 in which said means for moving said shim comprises a threaded member having one end threadedly connected to said cutter body and an opposite end connected to said shim member.

3. A cutter according to claim 2 which further comprises said threaded member when in place forming an acute included angle with the bottom of said recess.

4. A cutter according to claim 3 which further comprises said ends of said threaded member being oppositely threaded from one another.

* * * * *